June 18, 1963 H. E. HARING ETAL 3,093,883
MANUFACTURE OF SOLID ELECTROLYTIC CAPACITORS
Original Filed April 2, 1953

INVENTORS
H. E. HARING, DECEASED
 EUGENE M. HARING, HIS EXECUTOR
R. L. TAYLOR
BY
ATTORNEY

United States Patent Office 3,093,883
Patented June 18, 1963

3,093,883
MANUFACTURE OF SOLID ELECTROLYTIC
CAPACITORS
Horace E. Haring, deceased, late of Summit, N.J., by
Eugene M. Haring, executor, Summit, N.J., and Raymond L. Taylor, Berkeley Heights, N.J., assignors to
Bell Telephone Laboratories, Incorporated, New York,
N.Y., a corporation of New York
Original application Apr. 2, 1953, Ser. No. 346,416. Divided and this application Feb. 9, 1962, Ser. No. 172,352
10 Claims. (Cl. 29—25.42)

This invention relates to methods of manufacturing solid electrolytic capacitors. This application is a division of application Serial No. 346,416, filed April 2, 1953.

Electrolytic capacitors have long utilized the advantageous electrical and physical properties of the dielectric film of minute and controllable thickness which may be formed upon the surface of certain metals. Examples of these metals include tantalum, aluminum, tungsten, columbium, hafnium, titanium, and zirconium which, therefore, have been termed "film forming metals. The dielectric or barrier film is formed on the surface of such metals by causing an electrical current to flow from an electrode of such a metal, which is made positive or anode, to another electrode, both immersed in an oxygen supplying ionizable solution known as the electrolyte. Conventional electrolytic capacitors are made up of a filmed anode, a liquid or paste electrolyte, and a cathode, which may be the enclosing can of the capacitor.

Certain disadvantages arise in the conventional electrolytic capacitor due to the presence of the liquid or a liquid carrying paste. Physically, an electrolyte impervious container is a necessity. Furthermore, some type of seal around terminals emerging from the interior of the capacitor is necessary to avoid the loss of the electrolyte. The elements of an impervious container and liquid seals needlessly increase the capacitor volume. The presence of a liquid electrolyte has marked detrimental effects upon the electrical characteristics of such capacitors also. An increase in viscosity, or freezing of the electrolyte, results in a marked decrease in capacitance coupled with a rapid rise in the series resistance of the capacitor.

In the past, some attempts have been made to eliminate the liquid electrolyte from such devices by placing the cathodic element directly in contact with a filmed anode. These attempts have met with failure because minute imperfections in the film are inevitable and these result in direct shorts between the electrodes. The shorts are permanent rendering the device useless for there is no electrolyte present to heal and maintain the barrier film.

It is an object of this invention to improve electrical capacitors employing anodically filmed electrodes. A more specific capacitors employing anodically filmed electrodes. A more specific object is to utilize to the fullest extent possible the volumetric advantages of such electrodes.

Another object of this invention is to enable utilization of essentially only inorganic stable materials to realize a solid dry electrolytic capacitor.

A further object of this invention is to achieve in such a device, a capacitor having substantially uniform electrical characteristics in a range of temperature from approximately —80° C. to +80° C. or higher.

Still another object of this invention is to realize a method of insuring the formation of a substantially impervious dielectric film between capacitor electrodes.

In one embodiment of this invention, the anode of the capacitor comprises a porous body of compressed particles of a film forming metal. The entire surface of the porous body including the internal pores is covered with an electrolytically formed oxide film. The filmed porous electrode is impregnated with a semiconductive material, manganese dioxide, constituting a solid electrolyte in intimate contact with the anodic film. The terms solid or dry are used herein to indicate the substantially complete absence of any liquid.

The semiconductive layer is coated with a conducting deposit such as graphite and the assembly sheathed with a covering, as by spraying, evaporating or melting on metal suitable for the attachment of a cathode lead, for example a copper wire.

Solid electrolytic capacitors are manufactured in accordance with this invention by compressing particles of a film forming metal into a porous body. The porous body may include a short length of solid lead of the same metal to which a flexible lead is attached. The porous electrode is suspended in a liquid electrolyte which permeates the entire porous body, and then is made the anode for forming a barrier over the entire surface of the body, including the internal surface of the pores. The filmed electrode is then removed from the liquid electrolyte and impregnated with a manganese dioxide by dipping it in a solution which is pyrolytically convertible to manganese dioxide in intimate contact with the anodic film. Following impregnation the assembly is subjected again to anodizing in a liquid electrolyte to heal or eliminate any imperfections in the barrier film. The assembly is then removed from the electrolyte and further impregnated with the manganese dioxide. A conducting deposit is formed over the manganese dioxide layer to which a cathode lead may be attached by impregnating the assembly with a conducting dispersion such as graphite in water, driving off the water. The outer surface of the carbon coated assembly in turn may be coated with a metal. Suitable leads to the external metallic coating and the porous body complete the electrical connections to the capacitor.

It is a characteristic of this invention that the essential constituents of the resulting capacitor are all dry inorganic stable materials.

A feature of this invention lies in healing the dielectric film after the first pyrolytic conversion by a second anodizing step and then further impregnating the electrode.

A more complete understanding of this invention may be had by reference to the following detailed specification and the drawing in which.

Figure 1:
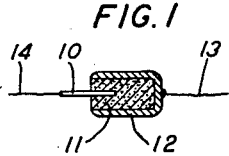
FIG. 1 is a diametrical sectional view of a cylindrical capacitor embodying this invention.

Referring now to FIG. 1, there may be seen an embodiment of this invention which includes a solid tantalum wire 10, one end of which is embedded in a porous body 11. Overlying the external surface of the completed unit is a conducting coating or casing 12, such as sprayed copper or melted-on lead-tin solder. A suitable lead 13 is attached, as by soldering, to the conducting coating 12. A similar lead 14 is attached, as by welding, to the solid tantalum wire 10. The particular capacitor as shown in FIG. 1 is rated at 5 microfarads at 20 volts. It has a series resistance of between 1.5 and 5 ohms at 1,000 cycles and a leakage current of 0.0007 and 0.04 at 5 volts and 20 volts, respectively. The capacitor has a volume of approximately 0.01 cubic inch, and when coated with a dielectric lacquer requires no additional container or insulation.

Figure 2:
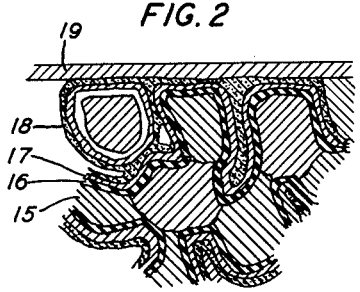
FIG. 2 is a magnified view of a fragmentary surface portion of the embodiment of FIG. 1.

Referring now to FIG. 2, the detailed composition of the porous body 11 of FIG. 1 may be seen. It includes a porous electrode 15 of a film forming metal. By film forming metal is meant a metal capable of electrolytically forming a dielectric film on its surface when made anodic in an electrolytic solution. This class of metals includes tantalum, aluminum, tungsten, columbium, hafnium, titanium, and zirconium. Upon the entire surface of the porous electrode 15, an electrolytically formed dielectric oxide film 16 is present. The film may vary in thickness up to 2,000 Angstrom units, the exact thickness being directly proportional to the voltage at which the dielectric film was formed. In this particular emobdiment, the anodic film is in the order of 500 Angstrom units thick. The filmed porous electrode or anode is impregnated with a layer 17 of a higher oxide of manganese in intimate contact with the film 16. Materials which may be utilized successfully in carrying out this invention are the semiconductive higher oxides of manganese which may be deposited as the product of pyrolytic decomposition of a compound of manganese. The semiconductive manganese dioxide constitutes a solid electrolyte counterpart of the liquid electrolyte of the wet electrolytic capacitor.

The porous electrode 15, film 16, and manganese dioxide layer 17 are also impregnated with a deposit 18 of a good conducting material such as graphite, overlying the semiconductive layer 17. The deposit 18 of conducting material is the counterpart of the cathodic element or can in the wet electrolytic capacitor.

In order to facilitate electrical connection to the conducting deposit 18, a sprayed or melted-on metal casing 19 encompasses the major portion of the exterior of the porous body 11 in contact with the conducting deposit 18.

Figure 3:
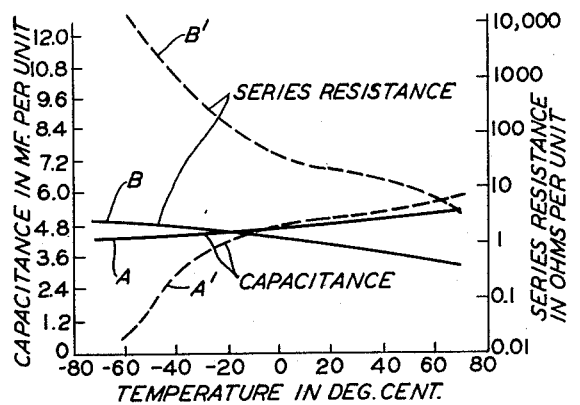
FIG. 3 is a graphical representation of the temperature characteristics of the capacitor in accordance with this invention.

Referring now to FIG. 3, a graphical representation may be seen of the capacitance and series resistance characteristics of a dry electrolytic capacitor unit constructed in accordance with this invention. The curve marked A depicts the variation of capacitance of a solid electrolytic capacitor in accordance with this invention, over the range from approximately −80° C. to +80° C. The capacitance variation with change in temperature approaches linearity throughout the entire range and the total variation is extremely slight. On the other hand, the capacitance of a conventional paste electrolytic capacitor suffers a marked falling off in the range below −20° C. as is shown by curve A′. Curve B illustrates the slight variation of series resistance of a capacitor constructed in accordance with this invention with respect to variation in temperature over a range of from substantially −80° C. to +80° C. The corresponding curve of the variation of the series resistance in a conventional 25 volt paste type electrolytic capacitor over a similar range is shown in curve B′. The series resistance of the dry electrolytic capacitor made in accordance with this invention is substantially linear throughout the range; and in contradistinction to the characteristic of conventional electrolytic capacitors, the increase in series resistance at low temperatures is slight. The adverse effect of low temperature upon the series resistance and the capacitance of conventional electrolytic capacitors has practically precluded their use in low temperature applications. There is no marked change in either of these characteristics in capacitors embodying this invention, thereby extending the useful range of temperatures for electrolytic capacitors.

Figure 4:
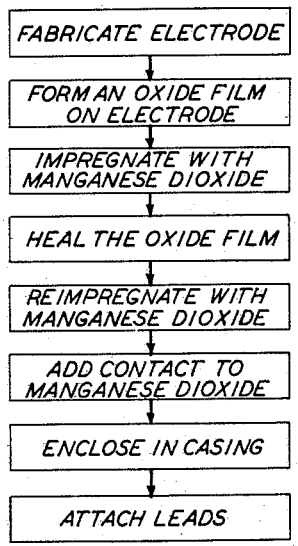
FIG. 4 is a diagrammatic representation of the method of this invention.

This solid electrolytic capacitor is manufactured by the method illustrated by the block diagram of FIG. 4. The porous electrode is produced by compressing and sintering particles of a film forming metal, for example tantalum, until they are bonded into a rigid porous mass. In the same step a solid wire of the same metal is bonded to the mass, with one end embedded within the porous body. An advantageous shape for the porous electrode is that of a cylinder. The porous electrode may be cleaned if necessary by any one of a number of conventional cleaning methods. The clean porous electrode is immersed in an electrolytic solution supported by the solid tantalum wire, through which a positive potential of, for example 30 volts, is applied for several hours. The electrolyte used may be either an aqueous solution or a fused salt electrolyte. A sheet of tantalum immersed in the solution is a suitable cathode. In order to obtain desirable high temperature electrical characteristics, it is highly advantageous to use a fused salt electrolyte which is maintained at a temperature high enough to assure the liquidity of electrolytic solution and to readily anodize the electrode, but low enough to avoid the formation of a powdery oxide deposit instead of a uniform dielectric film. A fused salt electrolyte comprising the eutectic mixture of sodium nitrate and sodium nitrite in equal parts of weight, maintained at a temperature in the order of 250°, fulfills these requirements particularly well. Examples of other electrolytes are the mixtures of 64 percent potassium nitrate and 34 percent lithium nitrate by weight, and the mixture of 54 percent potassium nitrate, 30 percent lithium nitrate and 16 percent sodium nitrate by weight. Electrolytes used in carrying out this invention are oxygen providing salts or salt mixtures which are molten at a temperature well below that at which a powdery grey oxide of the anode material is formed. In the case of tatalum this temperature is in the order of 300° C.

Upon the passage of current through a porous tantalum electrode and the electrolyte, the anoidic film of tantalum oxide ($TaO_5$) is formed giving evidence of its physical presence by a brilliant interference color which changes as the film increases in thickness. Film formation is conducted in accordance with established electrolytic practice until a film of the desired voltage and leakage current characteristics has been obtained. A suitable method is to apply a potential of 30 volts until the leakage current drops off to a practical minimum.

After formation of the anodic film, the porous electrode is removed from the liquid electrolyte and immersed in an aqueous solution of manganous nitrate until the electrode is thoroughly impregnated with the solution. The electrode is then pyrolytically converted at a temperature sufficient to decompose the manganous nitrate and convert it to manganese dioxide, e.g., 200–300° C. for a period of a few minutes or at least until all odor of nitrogen products is gone. The step of immersing in the manganous nitrate solution and converting it to manganese dioxide is repeated two or three times to insure a thorough impregnation. Upon subjection to the temperature required to convert the manganous nitrate to manganese dioxide, gaseous products including oxides of nitrogen are given off, leaving minute openings into the interior of the porous electrode assembly.

The electrode assembly, including the porous electrode 11, anodic film 16 and layer 17 of manganese dioxide in contact with the anoidic film is then replaced in the fused salt bath and anodized again for in the order of one half the original forming time at approximately one half the original forming voltage. This step, anodically healing imperfections in the oxide film, reduces the leakage current to a point of usefulness for the capacitor. Commonly, this step results in a leakage current of less than 0.1 milliampere at 20 volts on a unit such as that pictured in FIG. 1.

After the step of anodically healing imperfections, the electrode is further impregnated with manganous nitrate, which is then converted pyrolytically in the same manner as the previous impregnation to manganese dioxide. The second application of manganese dioxide not only thickens the coating of this semiconductor but also replaces these portions of the original coating which were reduced in the process of repairing residual flaws. The further impregnated electrode assembly is then impregnated with a conducting deposit, as by immersing the unit in an aqueous suspension of graphite, followed by air drying or heating of the unit to drive off the water. The assembly is then suspended from the solid tantalum wire, and a metal coating is sprayed or melted onto the cylindrical surface. Suitable leads are attached to the solid tantalum lead and the external casing. The solid tantalum lead of course must be electrically insulated from the external casing. The capacitor may be suitably finished by coating the surface with lacquer.

Figure 5:
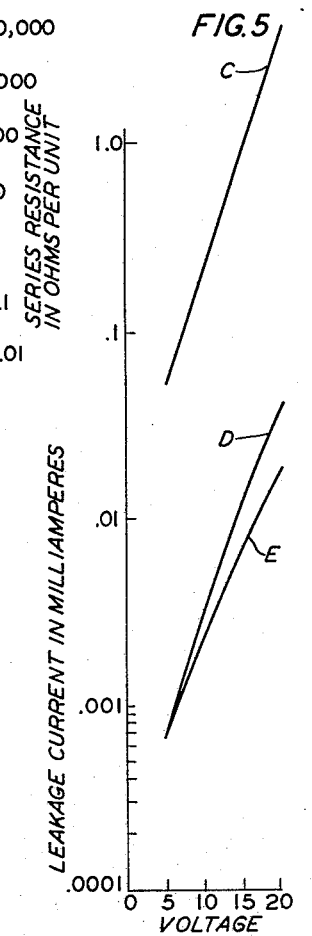
FIG. 5 is a graphical representation of the reduction in capacitor leakage current resultant from this invention.

Capacitors made in accordance with this invention are constructed of dry essentially inorganic materials forming a compact rigid body of extremely highly capacity per unit volume. The solid manganese dioxide layer is in intimate contact with the filmed anode similar to liquid electrolytes. In this solid electrolytic capacitor the healing of breaks in the anodic film is accomplished by subjecting the filmed anode impregnated with semiconductor to re-anodizing in a fused salt bath followed by reimpregnation with solid electrolyte. The step of healing the anodic film and reimpregnating with the semiconductive material includes in the manufacture certain of the characteristics of the conventional electrolytic capacitor, particularly the ability to reform breaks in the anodic film. The effect of healing the anodic film and further impregnation with semiconductive material is apparent upon examination of FIG. 5. Curve C denotes the leakage current of a 5 microfarad capacitor prior to healing and reimpregnating. The leakage current ranging from approximately 0.06 to 1.0 in milliamperes at voltages from 5 to 20 is above that allowable in commercially useful capacitors. However, upon healing and reimpregnating, the leakage current is reduced to values in the order of 0.0006 to 0.05 at 5 to 20 volts, as shown by curve D. An additional reduction in leakage current occurs upon aging of the capacitor or voltage after healing and reimpregnating, as shown by curve E. Healing of the anodic film and reimpregnation with semiconductor results in a solid dry capacitor which has a leakage current, capacitance and series resistance within useful ranges.

It is to be understood that the above described arrangements are illustrative of the application of the principles of the invention. Numerous other arrangements may be devised by those skilled in the art without departing from the spirit and scope of the invention.

What is claimed is:

1. The process of producing a capacitor body comprising, providing a tantalum oxide coated porous tantalum pellet with a manganese salt disposed within its crevices, converting said salt to manganese dioxide by firing at a temperature of about 300° C., electrolytically reforming the oxide coating of said tantalum pellet, disposing additional manganese salt in said crevices and firing at about 300° C.

2. The method of claim 1 wherein the salt disposed within the crevices of the tantalum pellet is manganous nitrate, and said conversion steps are repeated with further manganous nitrate disposed within the crevices.

3. A process for producing an improved body for incorporation in a tantalum pellet electrolytic capacitor, said process characterized by the steps of providing a porous tantalum body in which the tantalum surface has an in situ formed coating of tantalum oxide, applying to the tantalum oxide coating a layer of a solution of a manganese salt decomposable upon heating to form manganese oxide, heating the layer at a temperature of about 300° C. to convert it to manganese oxide, reforming the oxide coating on the tantalum surface, applying a layer of a solution of a decomposable manganese salt to said coated tantalum surface, and heating the additional layer at a temperature of about 300° C. to convert it to manganese oxide.

4. The process for producing tantalum pellet electrolytic capacitors having a manganese dioxide electrolyte including the steps of converting a manganous salt disposed within the crevices of an oxide coated tantalum pellet to manganese dioxide by firing at a temperature of about 300° C. until gas evolution stops, electrolytically reforming the oxide coating of said tantalum pellet, disposing additional manganous salt in said crevices and firing at about 300° C., coating the pellet with a moisture-free layer of carbon particles and finally spraying said pellet with a metal coating.

5. A process for producing a capacitor, said process being characterized by the steps of providing a porous tantalum body in which the tantalum surface has an in situ formed coating of tantalum oxide, applying to the tantalum oxide coating a layer of a solution of a manganese salt decomposable upon heating to form manganese oxide, heating the layer at a temperature of about 300° C. to convert it to manganese oxide, reforming the oxide coating on the tantalum surface, applying a layer of a solution of a decomposable manganese salt to said coated tantalum body, heating the additional layer at a temperature of about 300° C. to convert it to manganese oxide, and applying an electrically conductive connection to said manganese oxide.

6. A process for producing a tantalum capacitor comprising the steps of anodizing a porous tantalum body for forming a coating of tantalum oxide over the exposed surface, impregnating the tantalum body with a solution of a manganese salt decomposable upon heating to form manganese dioxide, heating the tantalum body for a time and at a temperature to convert substantially completely the manganese salt to manganese dioxide, anodizing again the tantalum body to reform the tantalum oxide coating, impregnating again the tantalum body with a solution of the decomposable manganese salt, reheating the impregnated body at a temperature and for a time to convert substantially completely the manganese salt to manganese dioxide, and applying an electrically conductive connection to said manganese dioxide.

7. The process in accordance with claim 6 further characterized in that the step of applying an electrically conductive connection to said manganese oxide includes coating the manganese oxide with graphite and coating the graphite with a metal coating.

8. The method of manufacturing capacitors comprising the steps of electrolytically forming a dielectric oxide film upon a porous electrode of film-forming metal, impregnating the filmed electrode with a material convertible to a semiconductive oxide, pyrolytically converting the impregnating material in situ into a semiconductive oxide, electrolytically reforming said dielectric oxide film, reimpregnating with a material convertible to a semiconductive oxide, pyrolytically converting the impregnating material in situ into a semiconductive oxide, and impregnating the electrode with a good conducting material constituting a second electrode of the capacitor.

9. The method of manufacturing electrolytic capacitors from a porous body made up of compressed particles of a film-forming metal comprising the steps of electrolytically anodizing said body to form a dielectric film upon the exposed surface of each of the particles making up said porous body, impregnating said porous body with a material capable of conversion to a semiconductive oxide, pyrolytically converting said material to a layer of semiconductive oxide in situ overlying said dielectric film and in intimate contact therewith, electrolytically reanodizing said body to heal imperfections in the dielectric film resultant from the application of the semiconductive oxide to the dielectric film, and applying a coherent deposit of conducting material over the semiconductive oxide.

10. The method in accordance with claim 9 in which the film-forming metal is tantalum, the material which is converted to a semiconductive oxide is manganous nitrate, and the conducting material is graphite.

No references cited.